US006912993B2

(12) United States Patent
Oyamada et al.

(10) Patent No.: US 6,912,993 B2
(45) Date of Patent: Jul. 5, 2005

(54) THROTTLE SYSTEM

(75) Inventors: Tomonaga Oyamada, Chiyoda (JP); Yuuichi Yanagase, Tamatsukuri (JP); Takehiko Kowatari, Kashiwa (JP); Teruhiko Minegishi, Hitachinaka (JP); Eisuke Wayama, Hitachinaka (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 10/602,641

(22) Filed: Jun. 25, 2003

(65) Prior Publication Data
US 2004/0011327 A1 Jan. 22, 2004

(30) Foreign Application Priority Data
Jun. 25, 2002 (JP) ........................................ 2002-183796

(51) Int. Cl.[7] ................................................ F02D 9/10
(52) U.S. Cl. ........................ 123/337; 251/214; 251/305
(58) Field of Search ................................ 123/336, 337; 251/214, 305, 308

(56) References Cited

U.S. PATENT DOCUMENTS

| 2,054,369 A | | 9/1936 | Francis, Jr. |
| 3,100,500 A | | 8/1963 | Stillwagon |
| 3,143,132 A | | 8/1964 | Pangburn |
| 4,190,258 A | * | 2/1980 | Arai et al. .................. 277/554 |
| 4,938,452 A | * | 7/1990 | Imamura et al. ............ 251/305 |
| 6,341,593 B2 | * | 1/2002 | Kamimura et al. ......... 123/337 |

FOREIGN PATENT DOCUMENTS

| EP | 1 033 485 A2 | | 9/2000 | |
| JP | 10-103088 | * | 4/1998 | ............. F02D/9/10 |
| JP | 11-210503 | | 8/1999 | |

* cited by examiner

Primary Examiner—Tony M. Argenbright
(74) Attorney, Agent, or Firm—Antonelli, Terry, Stout & Kraus, LLP

(57) ABSTRACT

To reduce the amount of air leakage from the air cleaner side of the throttle system into the engine side on an occasion where the throttle valve is set to a closed position, a seal material is installed in the air passage that runs from the upstream side of the suction passage, passes through the upstream side of the gap between the shaft and through hole, communicates with the gap formed by the stepped recession, the shaft and the bearing of the throttle body, runs in the circumferential direction of the shaft and through the downstream side of the gap, and reaches the downstream side of the suction passage.

19 Claims, 7 Drawing Sheets

Y-Y CROSS-SECTIONAL VIEW

X-X CROSS-SECTIONAL VIEW $S2 = (L - Ls) \times (D_3 - D_1)$

THROTTLE SYSTEM

BACKGROUND OF THE INVENTION

The present invention relates to a throttle system for adjusting the suction air flow in an internal combustion engine; and, more particularly, the invention relates to a mechanism that reduces the air leaking through the throttle system while the throttle valve is closed.

Because it is difficult in a throttle system of the type that is used, for example, in an engine, to completely seal the gaps between component parts, air leakage is caused through the gaps between component parts even when the throttle valve is at a closed position. More particularly, in a low speed operating condition, such as in an idling operation, where the air flow required by the engine is less, it is difficult to control the air flow precisely, because the percentage of the total air flow attributed to air leakage through the gaps between component parts increases, while the controllable air flow in the throttle valve decreases relatively. Besides, in order to run an engine at a lower speed, it is necessary to extremely lower the air leakage through the gaps between component parts, because the air leakage determines the minimum air flow of the throttle system.

A known throttle system, such as one disclosed in the Japanese Application Patent Laid-open Publication No. Hei 11-210503, has a construction in which a shaft is supported for rotation in a cylindrical throttle body by anti-friction bearings equipped with a seal mechanism, and a disc-shaped throttle valve is fastened on the shaft so as to rotate with the shaft. This publication indicates that, with this construction, the seal mechanism provided in the bearing operates to prevent air from leaking to the outside of the throttle body.

With a known construction of the type described above, a shaft runs across the suction passage of the throttle body, and the shaft is supported by anti-friction bearings so as to be able to rotate. Because of this, through holes through which the shaft is to be inserted and stepped recessions, that are stepped in the depth direction, for accommodating the anti-friction bearings are formed in the throttle body. The through holes are provided with a larger diameter than the shaft in order to prevent friction, abrasion or seizure, which may be caused in case the shaft contacts the surface which forms the hole. As a result of the above, a gap is formed between the shaft and through hole.

In addition, if the anti-friction bearing is installed in stepped recession of is the throttle body, it is necessary to provide a clearance in order to prevent friction, abrasion or seizure, which may be caused in case the rotating inner ring of the anti-friction bearing contacts the throttle body, and this clearance represents a gap formed by the anti-friction bearing, the shaft and the stepped recession of the throttle body.

The two gaps described above communicate with each other, and, in addition, the former gap communicates with the suction air passage of the throttle body, which represents the primary air passage in which the incoming air into the engine can be controlled. As a result, a throttle system as described above provides a condition such that air can easily flow from the high-pressure upstream side of the suction air passage into the low-pressure downstream side of the suction air passage via a flow passage through these gaps.

Since a lot of air flows from the air cleaner side into the engine suction side through the suction air passage, there arises a problem in that the amount of air leaking into the engine can hardly be reduced in actual practice, even under a condition where the throttle valve is closed and the primary air passage is shut.

SUMMARY OF THE INVENTION

An object of the present invention is to reduce the air leakage in a throttle system of an engine, particularly under a condition where the throttle valve is at a closed position.

The present invention solves the above-mentioned problem by providing a throttle system that is equipped with a seal structure for reducing the air flow in the course of the air passage through the above-mentioned gap between the shaft and throttle body and the gap formed by the shaft, the bearing and the throttle body.

To realize the foregoing object, in a throttle system, a through hole is formed in a throttle body, through which the shaft of a throttle valve is to be inserted; a recession, with a diameter larger than the through hole, for installing a bearing that supports the shaft to allow the shaft to rotate, is formed outside the through hole, and an enlarged recession that is larger than the through hole is formed between the through hole and recession; a bearing is installed in the recession so as to support the shaft to allow it to rotate; and a seal structure is provided at an area including the through hole, or at an area including the boundary between the enlarged recession and the through hole.

DETAILED DESCRIPTION OF THE INVENTION

Preferred embodiments of the present invention will be described hereunder with reference to the drawings.

Figure 1:
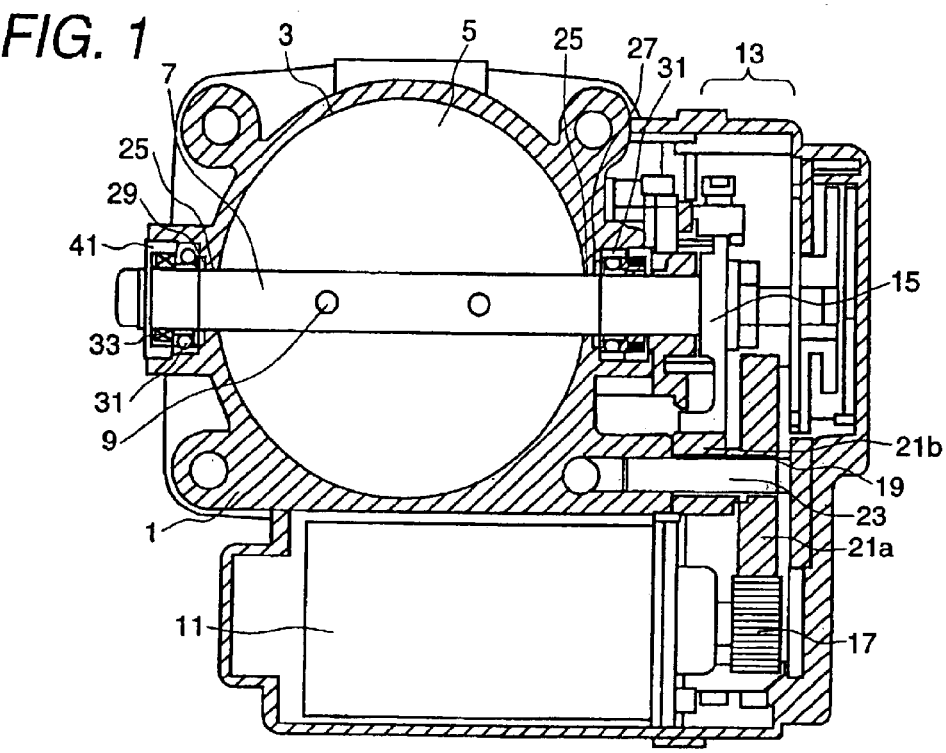
FIG. 1 is a cross-sectional view of a throttle system of the type to which the present invention may be applied.

FIG. 1 shows an example of the construction of a typical electronic-control throttle system (throttle system for an automotive internal combustion engine) to which the present invention may be applied. As is well known, an electronic-control throttle system is used to control the air flow incoming into an internal combustion engine.

The amount of the air that flows through a suction passage 3 in a throttle body 1 (in the direction perpendicular to the surface of the paper) is adjusted according to the degree of opening of a throttle valve 5. The throttle valve 5 is fastened onto a rotatable shaft 7 with set screws 9.

The shaft 7 is inserted into through holes 25 provided on each side of the suction passage 3, and it is supported at respective ends by bearings 31 that are fastened onto the shaft 7 at a drive side stepped recession 27 and at a follow side stepped recession 29, respectively, so as to enable the shaft to rotate. Anti-friction bearings 31 are employed in this embodiment.

On one end of the shaft 7, the final stage gear (hereinafter called the throttle gear) 15 of the reduction gear mechanism 13, that transmits the power of a motor (electric actuator) 11 to the shaft 7, is mounted. The gear mechanism 13 comprises the throttle gear 15, a pinion gear 17 mounted on the motor, and an intermediate gear 19.

The intermediate gear 19, comprising a large diameter gear 21a, which engages with the pinion gear 17, and a small diameter gear 21b, which engages with the throttle gear 15, is set on a gear shaft 23 that is mounted on the wall of the throttle body 1 so as to be able to rotate freely.

The motor 11 is driven in accordance with an acceleration signal or traction control signal that is interlocked with the acceleration pedal motion, and the power of the motor 11 is transmitted to the shaft 7 via the gears 17, 19 and 15 to operate the throttle valve 5.

Figure 2:
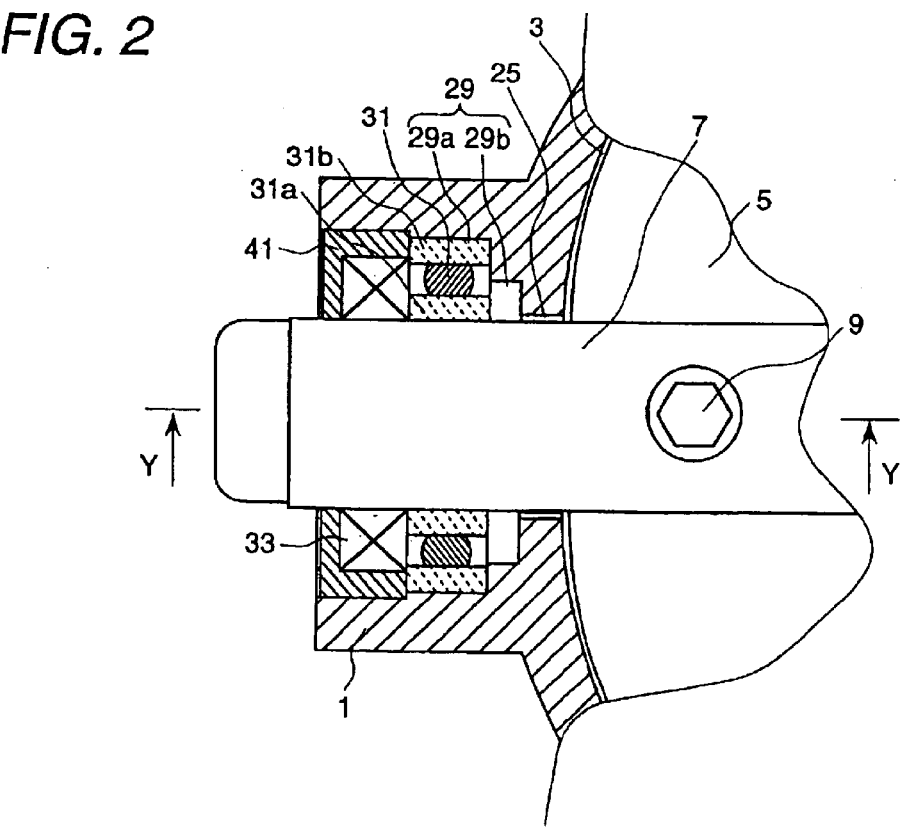
FIG. 2 is an enlarged cross-sectional view of a portion around the follow side stepped recession in FIG. 1.

FIG. 2 is an enlarged view of a portion of FIG. 1 where the shaft 7 is supported by the anti-friction bearing 31 mounted in the follow side stepped recession 29. The follow side stepped recession 29, comprising a bearing fastening portion 29a, into which the anti-friction bearing 31 is inserted, and a clearance 29b, which prevents the inner ring 31a, that is capable of rotating freely in the anti-friction bearing 31, from contacting the throttle body, is formed in the throttle body 1 concentrically with respect to the through hole 25.

Generally, the clearance 29b is smaller in diameter than the bearing fastening portion 29a, and the fastening position of the anti-friction bearing 31 is determined as the end of the bearing 31 is pressed onto the throttle valve side wall, resulting from the step, of the bearing fastening portion 29a. A seal 33 and a cover 41 are installed outside the anti-friction bearing 31 to prevent air and lubricant from leaking out of the throttle system.

The stepped recessions 27 and 29 will be described in more detail. The stepped recessions 27 and 29 are each formed in a manner such that, as seen from the insertion direction of the through hole 25 (axial direction of the shaft 7), multiple recessions, each having a circular cross section, are provided to form steps in the depth direction. In other words, a stepped recession is formed as a recession in which a large diameter is first formed from the outside of the throttle body 1 and then another recession with a small diameter is formed more deeply (in the bottom of the previous recession).

The bearing structure of the shaft 7 calls for an enlarged recession (enlarged hole) 29b, that is larger than the through hole 25, being formed between the through hole 25 side of the recession 29a, wherein the bearing 31 is installed (or that of the bearing 31), and the through hole 25.

Figure 3:
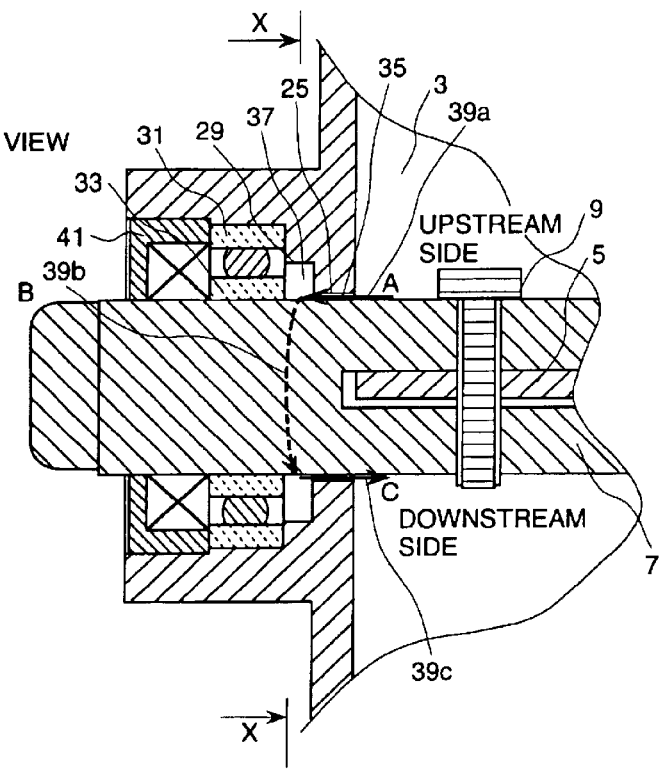
FIG. 3 is a cross-sectional view taken along line Y—Y in FIG. 2.
Figure 4:
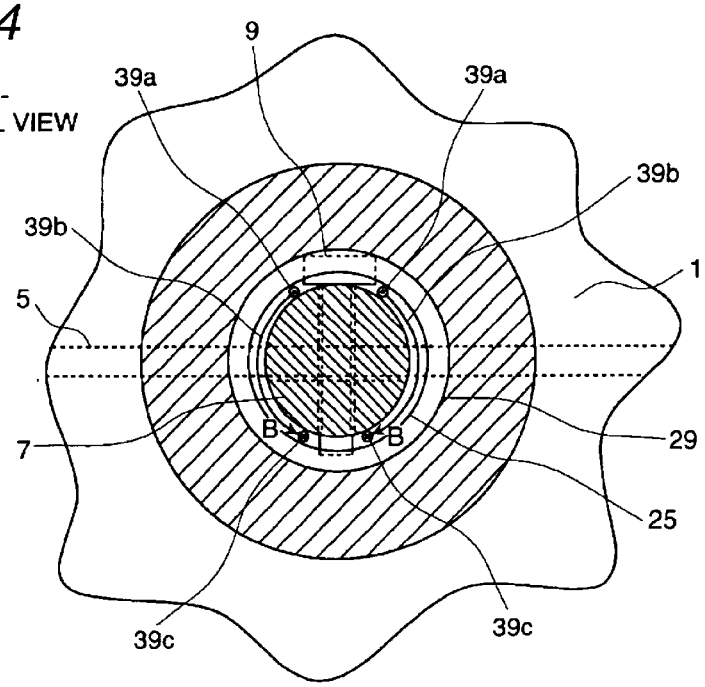
FIG. 4 is a cross-sectional view taken along line X—X in FIG. 3.

FIG. 3 is a cross-sectional view taken along line Y—Y in FIG. 2, and FIG. 4 is a cross-sectional view taken along line X—X in FIG. 3. In these figures, the upper side, as seen in the diagram, is the upstream side and the lower side is the downstream side of the throttle valve 5 in the suction passage 3.

The through hole 25 is formed with a larger diameter than the shaft 7 in order to prevent excessive friction, abrasion or seizure, which can be caused by contact with the rotating shaft 7. As a result of the above, a gap 35 is formed between the through hole 25 and the shaft 7, and the gap 35 communicates with a gap 37, which is defined by the follow side stepped recession 29, the anti-friction bearing 31 and the shaft 7, on one end thereof and with the suction passage 3 on the other end thereof on both the upstream and downstream sides. The air, therefore, can move between the upstream side and downstream side of the suction passage 3 through the above-described gaps.

If a pressure differential arises, as the upstream side becomes high pressure and the downstream side becomes low pressure, part of the air flowing in the suction passage 3 begins to flow firstly through an upstream through hole flow passage 39a, which forms the upstream side of the gap 35 between the through hole 25 and the shaft 7, and into the gap 37, which is defined by the follow side stepped recession 29, the anti-friction bearing 31 and the shaft 7, as shown by arrow A in FIG. 3.

Then, the air flows downstream along the circumference of the shaft 7 through the circumferential flow passage 39b, as shown by dashed arrow B in FIG. 4, from which it can leak out into the downstream side of the suction passage 3 through the downstream through hole flow passage 39c, which forms the downstream side of the gap 35 between the through hole 25 and the shaft 7, as shown by arrow C in FIG. 3.

Because a leakage passage like the one described above exists irrespective of the opening of the throttle valve 5, and since it also exists even on the occasion when the throttle valve 5 is set to the closed position in an effort to extremely restrict the air flow through the throttle system, it can be a factor in the deterioration of the precision in air flow control.

Figure 5:
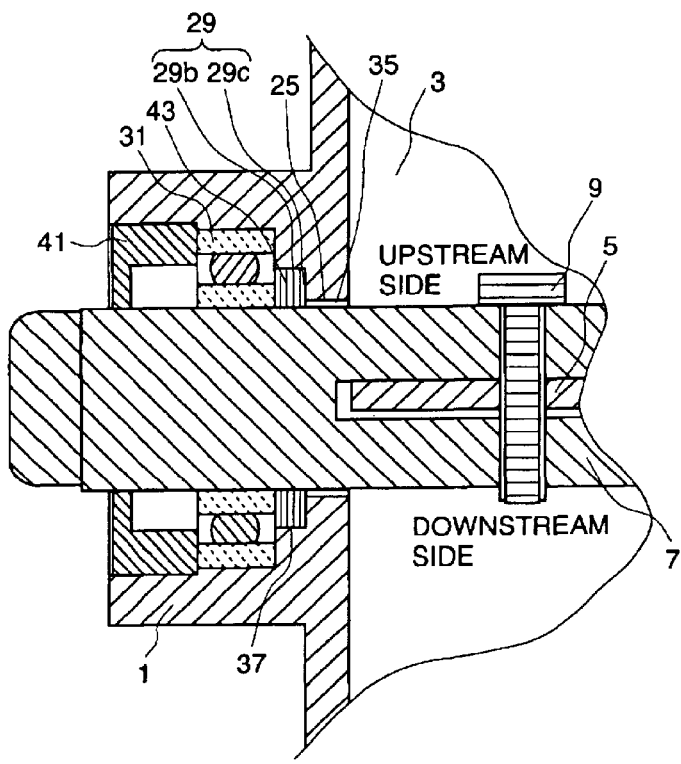
FIG. 5 is an enlarged cross-sectional view of a portion around the follow side stepped recession of the throttle system according to a first embodiment of the present invention.

FIG. 5 shows an example of the first embodiment of a throttle system to which the present invention is applied. In the air passage of the throttle system shown in FIG. 3, seal material 43 is inserted inside the gap 37, which is defined by the follow side stepped recession 29, the anti-friction bearing 31 and the shaft 7. Since the gap 37 forms a major part of the circumferential flow passage 39b, the provision of the seal material in the gap 37 prevents the flow passage 39b from being formed.

The seal material 43, the outside diameter of which is equal to or smaller than, but nearly equal to, the diameter of the clearance 29b, is made into a doughnut shape having a through hole, the diameter of which is equal to or larger than, but nearly equal to, the diameter of the shaft 7. The seal material 43 contacts the throttle valve side wall 29c of the follow side stepped recession 29, which is at the stepped recession side opening of the through hole, and the circumferential surface of the shaft 7. Thus, the seal material 43 produces a sealing effect at each contact area, preventing the air that flows out of the suction passage 3 through the gap 35 between the through hole 25 and shaft 7 from entering into the downstream side of the suction passage 3 and into the anti-friction bearing 31 side.

In this embodiment, a seal structure is provided at an area including the boundary between the clearance 29b and through hole 25. A fluorocarbon resin is used for the seal material 43, so as to prevent an excessive increase of the drive torque at the anti-friction bearing 31 and the shaft 7 that results from excessive friction caused by contact with the inner ring of the anti-friction bearing 31 or with the shaft 7. With the above-described construction, only a cover 41 is installed outside the anti-friction bearing 31 to prevent lubricant leakage from the throttle system to the outside or entry of dust from the outside into the throttle system.

Figure 6:
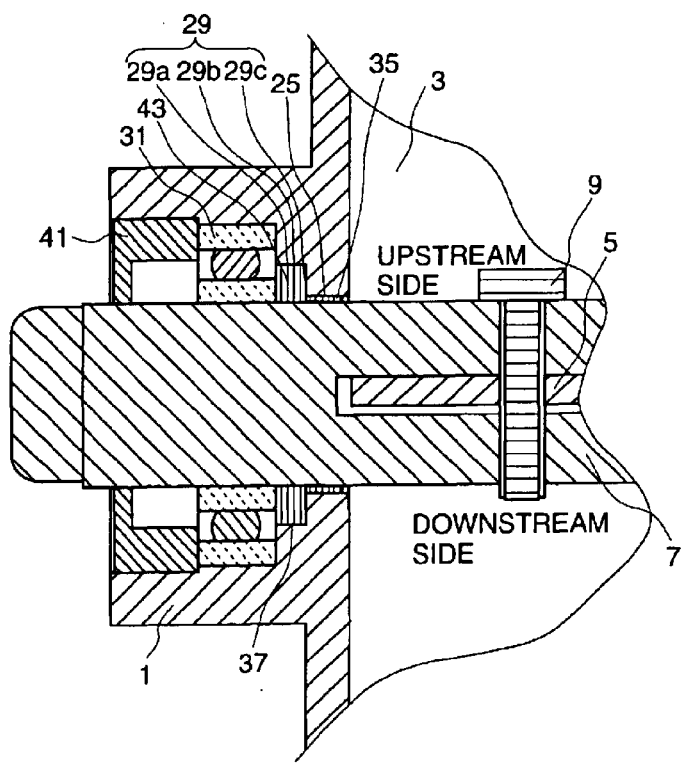
FIG. 6 is an enlarged cross-sectional view of a portion around the follow side stepped recession of the throttle system according to a second embodiment of the present invention.

FIG. 6 shows a second embodiment of a throttle system to which the present invention is applied. In this embodiment, the seal material 43, which is installed between the throttle valve side of the through hole 25 and the anti-friction bearing 31, is formed into a stepped shape, the outside diameter of which is smaller on the throttle valve 5 side and larger on the anti-friction bearing 31 side. The throttle valve side portion of the seal material 43, with a smaller outside diameter, is inserted into the gap between the through hole 25 and shaft 7, and the anti-friction gear 31 side portion, with a larger outside diameter, is inserted into the gap 37 formed by the follow side stepped recession 29, the anti-friction bearing 31 and the shaft 7.

The seal material 43 contacts the throttle valve side wall 29c of the follow side stepped recession 29, which is at the stepped recession side opening of the through hole, and the circumferential surface of the shaft 7. As in the first embodiment, the seal material produces a sealing effect at each contact area, preventing air flowing out of the suction passage 3 through the gap 35 between the through hole 25 and the shaft 7 from entering into the downstream side of the suction passage 3 and into the anti-friction bearing 31 side. In addition, because the throttle valve side portion of the seal material 43, with a smaller outside diameter, is inserted into the gap between the through hole 25 and the shaft 7, the air flow attempting to enter into this gap from the suction passage 3 is restricted, thus producing a much higher sealing effect than in the first embodiment.

In this embodiment, as explained above, a seal structure is provided at an area including the boundary between the clearance 29b and the through hole 25.

Figure 7:
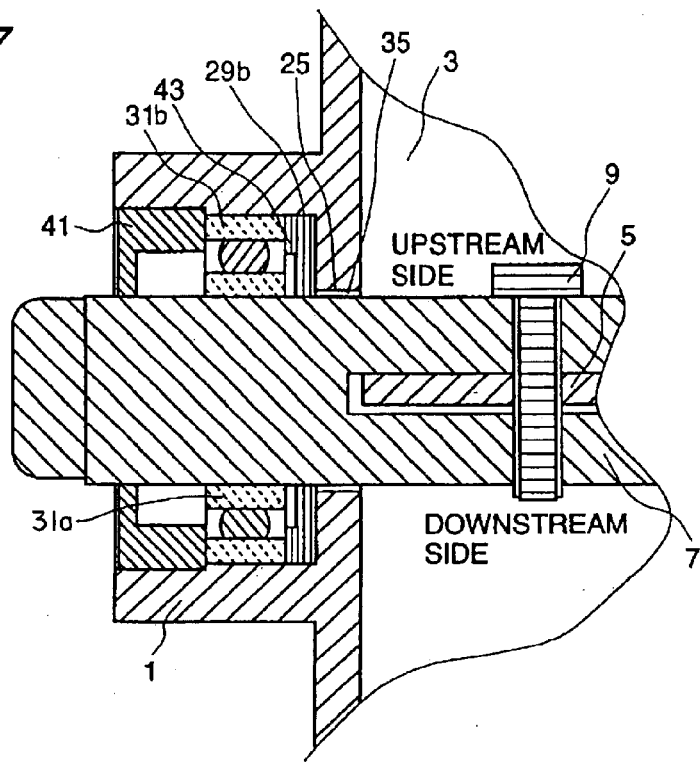
FIG. 7 is an enlarged cross-sectional view of a portion around the follow side stepped recession of the throttle system according to a third embodiment of the present invention.

FIG. 7 shows a third embodiment of a throttle system to which the present invention is applied. The seal material 43, which is installed between the throttle valve side of the through hole 25 and the anti-friction bearing 31, has an outside diameter that is equal to or smaller than, but nearly equal to, the diameter of the anti-friction bearing 31. A stepped recession is formed in the seal material 43, and the diameter of the recession at the anti-friction bearing 31 side is larger than that of the inner ring 31a of the anti-friction bearing 31, but smaller than that of the outer ring 31b. The diameter of the recession at the throttle valve 5 side is nearly equal to that of the shaft 7.

Because of the above-described construction, the seal material 43 is fixed in position as the anti-friction bearing 31 side contacts the outer ring 31b of the anti-friction bearing 31 and the throttle valve 5 side contacts the throttle valve 5 side wall 29c of the stepped recession, thus producing a sealing effect on each contact surface, while also defining the fastening position of the anti-friction bearing.

Besides, the through hole side of the seal material 43 contacts the outside circumferential surface of the shaft 7 and shuts off the air flow along the shaft surface. On the other hand, since the seal material 43 does not contain any portion that contacts the inner ring 31a, this embodiment has the advantage that the load torque applied to the rotating inner ring 31a does not increase, as compared to the first and second embodiments.

In addition, since the fastening position of the anti-friction bearing 31 on the throttle body 1 can be controlled by the thickness of the seal material 43, it becomes possible to eliminate a special process of machining to produce a clearance 29b on the throttle body.

In this embodiment, as explained above, a seal structure is provided in an area including the boundary between the clearance 29b and the through hole 25.

Figure 8:
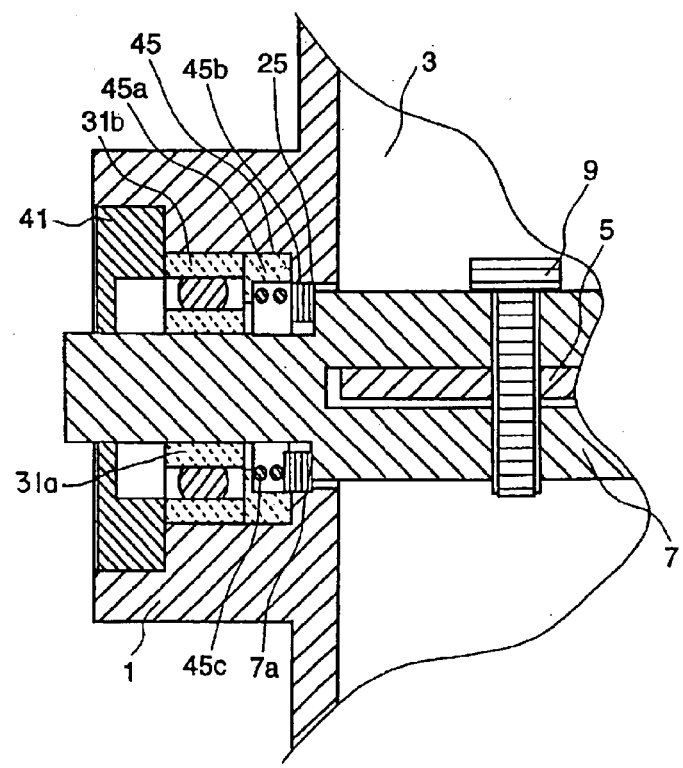
FIG. 8 is an enlarged cross-sectional view of a portion around the follow side stepped recession of the throttle system according to a fourth embodiment of the present invention.

FIG. 8 shows a fourth embodiment of a throttle system to which the present invention is applied. In this embodiment, the shaft 7 is formed into a stepped shape, and the anti-friction bearing 31 side portion has a smaller diameter than the throttle valve 5 side portion thereof. A seal mechanism component 45 is installed between the through hole 25 and the anti-friction bearing 31.

The seal mechanism component 45 comprises a housing 45a, a seal 45b and a spring 45c. The housing 45a is sandwiched and fastened between an end of the outer ring 31b of the anti-friction bearing 31 and the throttle valve side wall 29c of the stepped recession, and, hence, the fastening position of the anti-friction bearing 31 is defined at the same time.

A through hole is provided in the housing 45a so as to eliminate contact with the inner ring 31a. The seal 45b, the outside diameter of which is nearly equal to the diameter of the through hole 25, is formed into a cylindrical shape having a through hole, the diameter of which is larger than that of the smaller diameter portion of the shaft 7.

Because of the action of the spring 45c, the seal 45b is pressed with a specified force and contacts the shaft step wall 7a, which is formed as a result of the stepped configuration of the shaft 7, and also contacts the surface of the through hole 25.

In a throttle system as described above, the air that flows out of the suction passage 3 through the gap 35 between the through hole 25 and the shaft 7 is shut off by the seal 45b and is prevented from entering into the downstream side of the suction passage 3 and into the anti-friction bearing 31 side.

The housing 45a of the seal mechanism component 45 can be made of any material. If it is made of a metal or a ceramic, the fastening position of the anti-friction bearing 31 can be controlled more precisely than in the case of using a resin material.

Besides, since an appropriate compression force is applied onto the seal 45b by the spring 45c, the sealing performance is improved, and the life of the seal 45b against abrasion is also improved. In addition, compared to other methods, the above-described construction brings about an advantage in that the system can be constructed to be smaller using a small anti-friction bearing.

In this embodiment, as explained above, a seal structure is provided at an area including the boundary between the enlarged recession and the through hole 25 and on the through hole 25.

In the above-mentioned embodiments, the seal material 43, or the material of the seal 45b of the seal mechanism component 45, is selected to be made of metal, resin, ceramic, or the like. In particular, to reduce the load torque applied to the anti-friction bearing 31 and shaft 7 by contact with the rotating shaft 7 or inner ring 31a of the anti-friction bearing 31, it is effective to use a resin material with a high lubricity, such as a fluorocarbon resin, a polyether etherketone (PEEK) resin, a polyimide resin, a polyamide resin, or a polyphenylene sulfide (PPS) resin.

Figure 9:
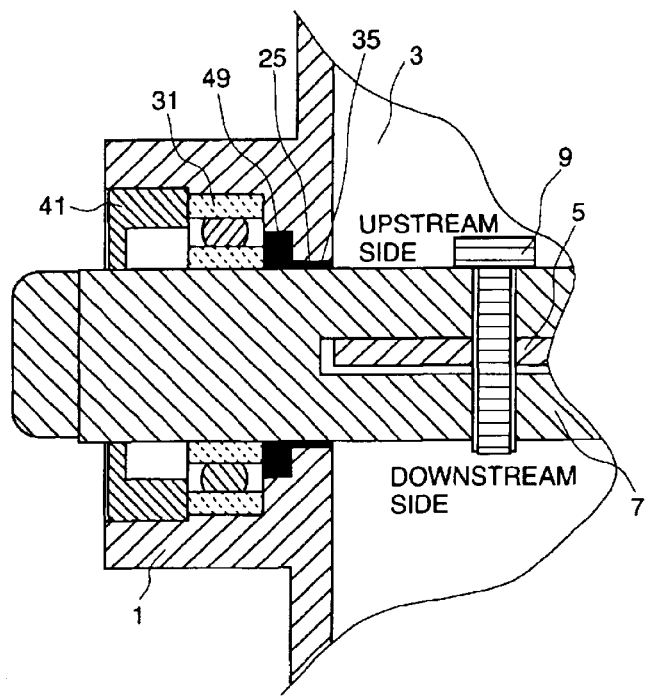
FIG. 9 is an enlarged cross-sectional view of a portion around the follow side stepped recession of the throttle system according to an embodiment of the present invention where the flow passage is sealed with adaptive material.

Otherwise, as shown in FIG. 9, a similar sealing effect can be attained by filling the gap defined by the follow side stepped recession 29, the anti-friction bearing 31 and the shaft 7, and the gap between the shaft 7 and through hole 25, with adaptive material 49 consisting of a material with excellent adaptivity and lubricity, such as manganese phosphate and molybdenum disulfide, instead of inserting the seal material 43.

The material referred to above is put into the gaps by means of coating or the application of pressure. The adaptive material wears drastically, and, hence, the torque loaded on the shaft 7 and the anti-friction bearing 31 increases at the very beginning. However, as it is put into continuous use and the adaptivity develops, a gap is formed between the filler material and shaft 7, and also between the filler material and inner ring 31a of the anti-friction bearing 31, according to the machining error of each component part. This brings about an advantage in that a variation in the sealing effect due to a machining error of each component part can be reduced. Besides, the above-described arrangement can be constructed very easily, and high accuracy is not required in the manufacture.

Next, an experiment for verifying the achievement of an air leakage reduction by use of the present invention will be described hereunder.

Figure 10:
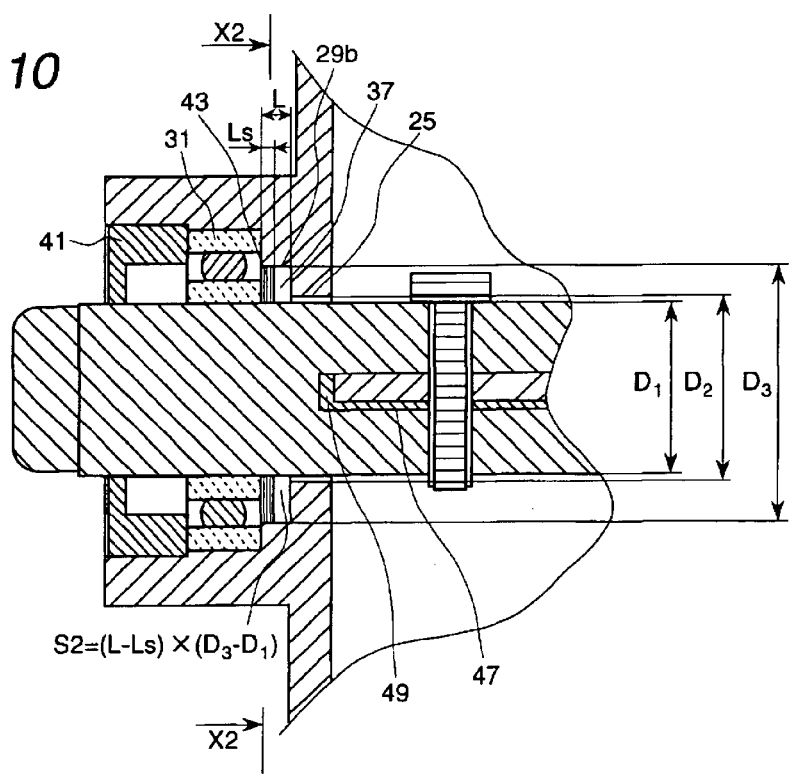
FIG. 10 is a diagram which defines the cross-sectional area S2 in the flow passage direction in the gap equivalent to the circumferential flow passage.

FIG. 10 is an enlarged view of a portion around the follow side stepped recession 27 of the throttle system used which was for the verification. In this figure, the diameter of the shaft 7 is denoted D1, the diameter of the clearance 29b in the follow side stepped recession 29 is denoted D3, and the length of the clearance 29b of the follow side stepped recession in the axial direction of the shaft 7 is denoted L.

The seal material 43, that is inserted into the gap formed by the follow side stepped recession 29, the anti-friction bearing 31 and the shaft 7, is made of a fluorocarbon resin and is formed into a cylindrical shape having an outside diameter D3, an inside diameter D1 and a length Ls.

Because of this, the seal material 43 contacts the inside circumference of the clearance 29b of the stepped recession 29 and the surface of the shaft 7, and shuts off the air flow at each contact area. With this construction, the cross-sectional area that is capable of forming the circumferential flow passage 39b shown in FIG. 4 can be defined as Expression (1) below.

$$S2 = (L-Ls) \times (D3-D1) \quad (1)$$

Figure 11:
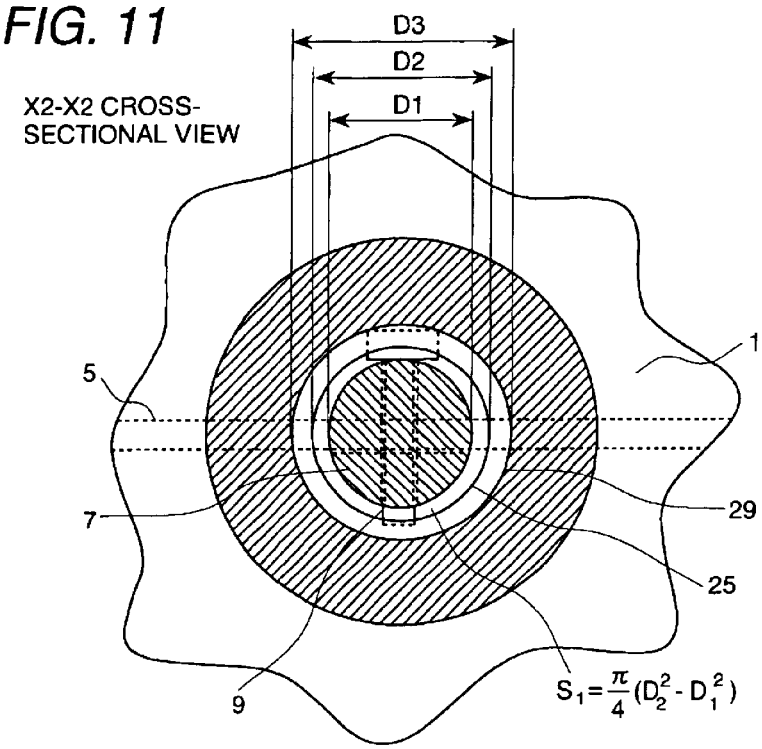
FIG. 11 is a cross-sectional view taken along line X2—X2 in FIG. 10, and it defines the cross-sectional area S1 in the flow passage direction in the gap between the through hole and shaft.

FIG. 11 is a cross-sectional view taken along line X2—X2 in FIG. 10. As shown in the figure, the cross-sectional area of the gap 35 between the through hole 25 and the shaft 7 can be defined as Expression (2), where the diameter of the through hole 25 is denoted D2.

$$S1 = (D22 - D1^2) \times \pi/4 \quad (2)$$

A throttle system equipped with a shaft 7 having a diameter of 10 mm and through hole 25 having a diameter of 10.2 mm is used in this experiment. For purposes of the experiment, the throttle valve 5 is fixed at the completely closed position to shut off the air flow in the suction passage 3. In addition, in order to prevent air leakage through a gap between the throttle valve 5 and the slit 47 that is provided for fastening the throttle valve 5 on the shaft 7, this gap is sealed by filling it with an adaptive material 49 having a high adaptivity.

On the basis of this construction, the air leakage to be measured is the leakage resulting from the gap between the through hole 25 and the shaft 7, as well as the gap formed by the follow side stepped recession 29, the anti-friction bearing 31 and the shaft 7. While the upstream side of the suction passage is set to 760 mmHg and the downstream side is set to 500 mmHg, the length Ls of the seal material 43 is changed and the air leakage is measured.

Figure 12:
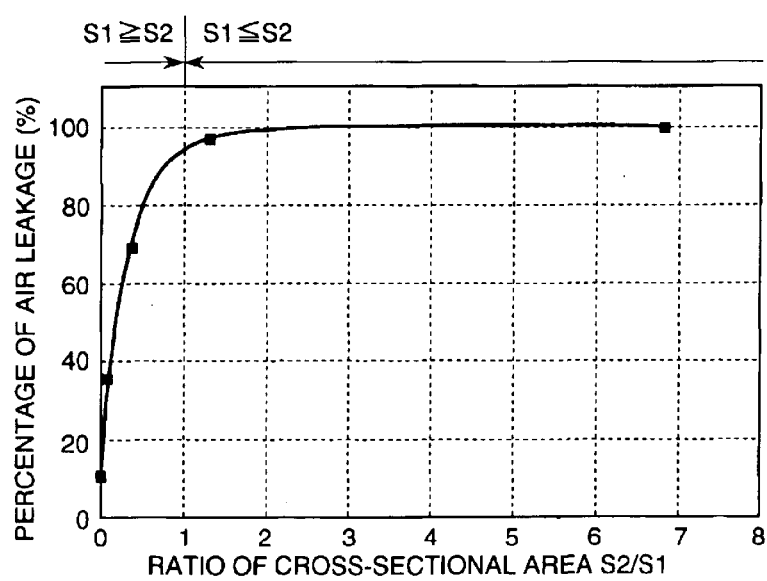
FIG. 12 is a graph showing the result of air leakage measurement on a throttle system according to an embodiment of the present invention, where the throttle valve is set to a completely closed position.

FIG. 12 shows the results produced by this experiment. The horizontal axis of the graph represents the ratio of the above-described cross-sectional areas S2 to S1, and the vertical axis represents the percentage of air leakage, where the amount of air leakage in case of inserting no seal material 43 is set to 100%.

As shown in the figure, it has been found that the effect of reduction of the air leakage gradually develops as the cross-sectional area of the gap 37 decreases and that the effect becomes remarkable in a range where the ratio of the cross-sectional areas S2 to S1 becomes equal to or less than 1.

In addition to inserting the seal material, a possible method of realizing the desired seal structure is to specify the circumferential length L of the clearance 29b so that the ratio of the cross-sectional areas S2 to S1 becomes equal to or less than 1, and to form the structure by machining. In other words, the seal structure is formed so that the area of the cross-section of the clearance (enlarged recession) 29b, which, including the axis of the shaft, is parallel to the axis, is made equal to or smaller than the area of the cross section in the gap between the circumferential surface of the shaft 7 and inner wall of the through hole 25, which crosses the axis of the shaft 7.

The above-described method requires no seal material and makes it possible to reduce the number of component parts. On the other hand, considering the fact that the gap between the diameters of the shaft 7 and through hole 25 is generally as small as 0.2 mm or so, L must be set to, for example, 0.2 mm or less in order to produce a remarkable effect of air flow reduction.

Precision machining and accurate construction are necessary for achieving the above-described effects, and the possibility of securing high reliability becomes questionable. For this reason, a method which involves insertion of a seal material in the form of adaptive material is rather preferable to facilitate the machining and construction and to secure high reliability.

When a seal structure is realized by a favorable ratio of the cross-sectional areas S2 to S1, as explained above, the seal structure is formed in an area including the boundary between the clearance (enlarged recession) 29b and the through hole 25.

Figure 13:
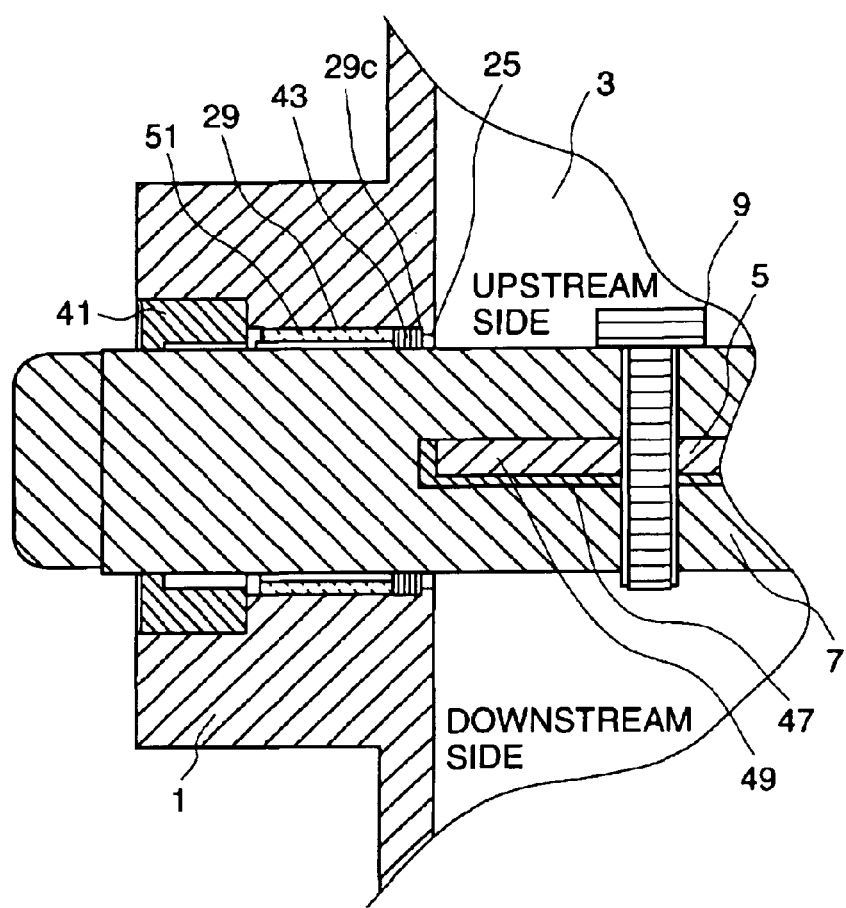
FIG. 13 is an enlarged cross-sectional view of a portion around the follow side stepped recession of a throttle system, equipped with a slide bearing, to which the present invention is applied.

FIG. 13 shows an embodiment of a throttle system, that is equipped with a slide bearing, to which the present invention is applied. The slide bearing 51, which is press-fit and held inside the follow side stepped recession 29, supports the shaft 7 so as to allow it to rotate as it contacts and slides along the shaft. Normally, a gap of 1/100 to 1/1000 of the diameter is provided between the inside diameter of the slide bearing 51 and the outside diameter of the shaft 7.

However, if the air flows into this gap from the gap between the shaft 7 and the through hole 25, a flow passage which extends downstream is produced. In this embodiment, in order to prevent this problem, the seal material 43 is installed between the slide bearing 51 and the throttle valve side opening end of the through hole 25 in the follow side stepped recession 29.

The seal material 43 is made into a doughnut shape having a through hole, the diameter of which is equal to or larger than, but nearly equal to, the diameter of the shaft 7. The seal material 43 contacts the throttle valve side wall 29c of the follow side stepped recession 29, which is at the stepped recession side opening of the through hole 25, and the circumferential surface of the shaft 7, and it produces a sealing effect at each contact area, preventing the air that flows out of the suction passage 3 through the gap between the through hole 25 and the shaft 7 from entering into the gap between the slide bearing 51 and the shaft 7.

Besides, when the throttle valve 5 is inserted and fastened in the slit 47, which is formed on the shaft 7 for fastening the throttle valve 5, the width of the slit 47 must be larger than the thickness and width of the throttle valve 47, and so a gap is produced there for this reason.

If the gap communicates with the gap between the through hole 25 and the shaft 7, a flow passage is produced from the upstream side of the suction passage 3 to the downstream side, resulting in air leakage. To prevent this in the embodiment shown in FIG. 13, the gap between the throttle valve 5 and the slit 47 for fastening the throttle valve 5 is sealed by filling it with an adaptive material 49 having a high adaptivity. As a result of providing this seal, air leakage can be further reduced.

In each embodiment described above, the description has been made on a precondition that the shape of the cross section of the stepped recession 29, as seen from the axial direction of the shaft 7, is circular; however, it is not always necessary to make the cross section circular, if ease of manufacturing or the shape of the bearing 31 need not be considered.

In such a case, the clearance (enlarged recession) 29b is formed in an area including the whole cross section that crosses the axis of the shaft 7 in the through hole 25, and the recession 29a in which the bearing 31 is installed is formed in an area including the whole cross section of the clearance (enlarged recession) 29b, as seen from the axial direction of the shaft 7.

According to the present invention, it becomes possible to reduce the air leakage through the gap formed by the shaft, the throttle body and the bearing of the throttle system.

Since drastic reduction of the amount of air leakage from the air cleaner side of the throttle system into the engine side is feasible on an occasion where the throttle valve is set to a closed position, it becomes possible to realize a throttle system that performs precise air flow control at a time of a low speed engine operation that does not require much air flow.

What is claimed is:

1. A throttle system, having
   a throttle body, wherein a through hole is formed to receive one end of the shaft of a throttle valve to be inserted there-through, a bearing recession, with a diameter larger than the through hole, for installing a bearing that supports the shaft, to allow the shaft to rotate, is formed outside the through hole, and an enlarged recession, that is larger than the through hole, is formed between the through hole and bearing recession;
   a bearing that is installed in the recession so as to support the shaft to allow the shaft to rotate; and
   a seal structure, which is provided at an area including the through hole or an area including the boundary between the enlarged recession and the through hole,
   wherein said seal structure forms a doughnut shape having the through hole therein of which a diameter is equal to or larger than, but nearly equal to, a diameter of said shaft of said throttle valve to prevent air leakage between an upstream and a downstream side of said throttle valve.

2. A throttle system according to claim 1, wherein the enlarged recession is smaller in diameter than the bearing recession and a combination of the bearing recession and enlarged recession forms a stepped recession.

3. A throttle system according to claim 1, wherein the seal structure is constructed of seal material made of fluorocarbon resin, polyether etherketone resin, polyimide resin, polyamide resin, or polyphenylene sulfide resin.

4. A throttle system according to claim 1, wherein said bearing is an anti-friction bearing.

5. A throttle system according to claim 1, wherein said doughnut shape seal structure contacts said shaft.

6. A throttle system according to claim 1, wherein said doughnut shape seal structure does not contact said shaft.

7. A throttle system, having:
   a throttle body, wherein a through hole is formed to receive one end of the shaft of a throttle valve to be inserted there-through, a bearing recession, with a diameter larger than the through hole, for installing a bearing that supports the shaft, to allow the shaft to rotate, is formed outside the through hole, and an enlarged recession, that is larger than the through hole, is formed between the through hole and bearing recession;
   a bearing that is installed in the recession so as to support the shaft to allow the shaft to rotate; and
   a seal structure, which is provided at an area including the through hole or an area including the boundary between the enlarged recession and the through hole, wherein the seal structure is so constructed that the area of a cross section in the enlarged recession, which, including the axis of the shaft, is parallel to the axis, is equal to or smaller than the area of a cross section in the gap between the circumferential surface of the shaft and inner wall of the through hole which crosses the axis of the shaft.

8. A throttle system, which is provided with a throttle body, comprising:
   a shaft that crosses a suction passage of the throttle body and supports a throttle valve midway in the suction passage; and
   bearings that support the shaft to allow the shaft to rotate axially,
   wherein a through hole is provided in the throttle body, through which the shaft is inserted so as to extend across the suction passage, and stepped recessions are provided in the throttle body for installing the bearings, whereby the suction air flow in the suction passage is controlled by operating the throttle valve through rotation of said shaft,
   wherein seal material is provided between the suction passage side of a bearing and a suction passage side opening of the through hole, so that a contact surface between the seal material and a stepped recession side opening of the through hole and the contact surface between the seal material and a shaft surface are sealed, and said seal material forms a doughnut shape having the through hole therein of which a diameter is equal to or larger than but nearly equal to a diameter of said shaft of said throttle valve to prevent air leakage between an upstream and a downstream side of said throttle valve.

9. A throttle system according to claim 8, wherein said doughnut shape seal material contacts said shaft.

10. A throttle system according to claim 8, wherein said doughnut shape seal material does not contact said shaft.

11. A throttle system, which is provided with a throttle body, comprising:
   a shaft that crosses a suction passage of the throttle body and supports a throttle valve midway in the suction passage; and
   bearings that support the shaft to allow the shaft to rotate axially,
   wherein a through hole is provided in the throttle body, through which the shaft is inserted so as to extend across the suction passage, and stepped recessions are provided in the throttle body for installing the bearings, whereby the suction air flow in the suction passage is controlled by operating the throttle valve through rotation of said shaft,
   wherein seal material is provided between the suction passage side of a bearing and a suction passage side opening of the through hole, so that a contact surface between the seal material and the inside circumference of the stepped recession or through hole and the contact surface between the seal material and a shaft surface are sealed, and said seal material forms a doughnut shape having the through hole therein of which a diameter is equal to or larger than but nearly equal to a diameter of said shaft of said throttle valve to prevent air leakage between an upstream and a downstream side of said throttle valve.

12. A throttle system according to claim 11, wherein said doughnut shape seal material contacts said shaft.

13. A throttle system according to claim 11, wherein said doughnut shape seal material does not contact said shaft.

14. A throttle system, which is provided with a throttle body, comprising: a shaft that crosses a suction passage of the throttle body and supports a throttle valve midway in the suction passage; bearings that support the shaft to allow the shaft to rotate axially; and seal material provided between the suction passage side of a bearing and a suction passage side opening of the though hole;
   wherein through holes are provided in the throttle body, through which the shaft is inserted so as to extend across the suction passage, and stepped recessions are provided in the throttle body for installing the bearings, whereby the suction air flow in the suction passage is controlled by operating the throttle valve,
   wherein the shaft has a stepped shape having a larger diameter on the suction passage side and a smaller diameter on the throttle body outward side, and a contact surface between the seal material and a side surface of the stepped shape of the shaft and the contact surface between the seal material and the inside circumference of the stepped recession or the inside circumference of the through hole are sealed.

15. A throttle system according to claim 14, wherein the bearing is an anti-friction roller having inner and outer rings, the diameter of the seal material is equal to or smaller than that of the anti-friction bearing outer ring, and there is provided a stepped recession in the seal material, in which the diameter of one recession is equal to or larger than that of the anti-friction roller inner ring and smaller than that of the outer ring, and the diameter of the other recession is equal to or larger than that of the shaft and equal to or smaller than that of the through hole.

16. A throttle system, which is provided with a throttle body, comprising:
   a shaft that crosses a suction passage of the throttle body and supports a throttle valve midway in the suction passage; and
   bearings that support the shaft to allow the shaft to rotate axially,
   wherein a through hole is provided in the throttle body, through which the shaft is inserted so as to extend across the suction passage, and stepped recessions are provided in the throttle body for installing the bearings, whereby the suction air flow in the suction passage is controlled by operating the throttle valve through rotation of said shaft,
   wherein seal material is provided between the suction passage side of a bearing and a suction passage side opening of the through hole, so that a contact surface between the seal material and a stepped recession side opening of the through hole and the contact surface between the seal material and a shaft surface are sealed,
   wherein the bearing is an anti-friction roller having inner and outer rings, the diameter of the seal material is equal to or smaller than that of the anti-friction bearing outer ring, and there is provided a stepped recession in the seal material, in which the diameter of one recession is equal to or larger than that of the anti-friction roller inner ring and smaller than that of the outer ring, and the diameter of the other recession is equal to or larger than that of the shaft and equal to or smaller than that of the through hole.

17. A throttle system, which is provided with a throttle body, comprising: a shaft that crosses a suction passage of the throttle body and supports a throttle valve midway in the suction passage; and bearings that support the shaft to allow the shaft to rotate axially
   wherein through holes are supported in the throttle body, through which the shaft is inserted so as to extend across the suction passage, and stepped recessions are provided in the throttle body for installing the bearings, whereby the suction air flow in the suction passage is controlled by operating the throttle valve through rotation of said shaft; and
   wherein a gap formed by the stepped recession, the shaft and a bearing of the throttle body, or a gap between the through hole and the shaft, is filled with adaptive material having a high adaptivity and lubricity in the course between the suction passage side of the bearing and the suction passage side opening of the through hole.

18. A throttle system, which is provided with a throttle body, comprising: a shaft that crosses a suction passage of the throttle body and supports a throttle valve midway in the suction passage; bearings that support the shaft to allow the shaft to rotate axially; and a seal mechanism;
   wherein through holes are provided in the throttle body, through which the shaft is inserted so as to extend across the suction passage, and stepped recessions are provided in the throttle body for installing the bearings, whereby the suction air flow in the suction passage is controlled by operating the throttle valve through rotation of said shaft; and wherein the seal mechanism is so provided that the circumferential cross-sectional area in a gap formed by the shaft, a bearing and the stepped recession is equal to or smaller than the axial cross-sectional area in a gap between the shaft and the through hole.

19. A throttle system, which is provided with a throttle body, comprising:

a shaft that crosses a suction passage of the throttle body and supports a throttle valve midway in the suction passage; and bearings that support the shaft to allow the shaft to rotate axially, wherein a through hole is provided in the throttle body, through which the shaft is inserted so as to extend across the suction passage, and stepped recessions are provided in the throttle body for installing the bearings, whereby the suction air flow in the suction passage is controlled by operating the throttle valve through rotation of said shaft, wherein seal material is provided between the suction passage side of a bearing and a suction passage side opening of the through hole, so that a contact surface between the seal material and a stepped recession side opening of the through hole and the contact surface between the seal material and a shaft surface are sealed, and wherein the bearing is an anti-friction roller having inner and outer rings, the diameter of the seal material is equal to or smaller than that of the anti-friction bearing outer ring, and there is provided a stepped recession in the seal material, in which the diameter of one recession is equal to or larger than that of the anti-friction roller inner ring and smaller than that of the outer ring, and the diameter of the other recession is equal to or larger than that of the shaft and equal to or smaller than that of the through hole.

* * * * *